United States Patent [19]

Arazi

[11] Patent Number: 5,206,824

[45] Date of Patent: Apr. 27, 1993

[54] METHOD AND APPARATUS FOR EXPONENTIATION OVER GF($2^N$)

[75] Inventor: Benjamin Arazi, Omer, Israel

[73] Assignee: Fortress U&T (2000) Ltd., Beer-Sheva, Israel

[21] Appl. No.: 702,612

[22] Filed: May 17, 1991

[30] Foreign Application Priority Data

May 20, 1990 [IL] Israel .......................... 94449

[51] Int. Cl.[5] .............................................. G06F 7/72
[52] U.S. Cl. .................................................. 364/746.1
[58] Field of Search ................................... 364/746.1

[56] References Cited

U.S. PATENT DOCUMENTS

| | | | |
|---|---|---|---|
| 4,567,568 | 1/1986 | Inagawa et al. | 364/746.1 |
| 4,587,627 | 5/1986 | Omura et al. | 364/746.1 |
| 4,745,568 | 5/1988 | Onysechuk | 364/746.1 |
| 4,797,848 | 1/1989 | Walby | 364/746.1 |
| 4,890,252 | 12/1989 | Wang | 364/717 |
| 5,031,130 | 7/1991 | Harada | 364/717 |

OTHER PUBLICATIONS

Scott et al., "Architectures for Exponontiation in GF($2^m$)" *IEEE J.on Selected Areas in Communication* vol. 6 No. 3 Apr. 1988, pp. 578-586.

"Articles for Exponentiation over GF($2^n$)," T. Beth et al., *Advances in Cryptology*, Eurocrypt '86, LNCS 263, pp. 302-310.

Wang et al., "VLSI Architectures for Computing Multiplications and Inverses in GF($2^n$)" *IEEE Trans. on Computers*, vol. C-34, No. 8, Aug. 1985 pp. 709-717.

*Primary Examiner*—David H. Malzahn
*Attorney, Agent, or Firm*—Merchant & Gould, Smith, Edell, Welter & Schmidt

[57] ABSTRACT

In a method for the exponentiation in a finite field GF($2^n$) the squaring operation is carried out by constructing a vector, the components of which are in alternation the components of the vector to be squared and the number 0. An apparatus for exponentiation in a finite field GF($2^n$), is described.

19 Claims, 7 Drawing Sheets

METHOD AND APPARATUS FOR EXPONENTIATION OVER GF($2^N$)

FIELD OF THE INVENTION

This invention relates to a method and an apparatus for exponentiation over GF($2^n$).

BACKGROUND OF THE INVENTION

GF($2^n$) denotes a Galois field containing $2^n$ elements, wherein n is greater than 1. Said field is a number system in which there are $2^n$ elements and in which the rules of addition and multiplication correspond to arithmetic modulo an irreducible polynomial of degree n with coefficients in G(2), G(2) being a number system in which the only elements are the binary numbers 0 and 1 and the rules of addition and multiplication are: $0+0=1+1=0$; $0+1=1+0=1$; $0\times 0=1\times 0=0\times 1=0$; $1\times 1=1$. The conventional approach to performing operations in GF($2^n$) involves choosing a polynomial P(x) of degree n which is irreducible over GF($2^m$), $m<n$ defining an element $\alpha$ in GF($2^n$) as a root of P(x)—satisfying $P(\alpha)=0$—and assigning the unit vectors of length n with binary components to the elements $1, \alpha, \alpha^2, \ldots, \alpha^{n-1}$.

Exponentiation over GF($2^n$) is an operation that is required for many purposes, described in prior art literature, three of which—message authentication, user identification and exchange of keys—will be recalled here.

Message Authentication

Unlike a true digital signature process, message authentication requires the cooperation of the authenticator. Here the recipient has online assurance of the authenticity of a received message. This process is very useful, for example, in all the scenarios where a closed group of users wishes to protect itself against the outside world. A typical case is where an agent sends a message to a branch, where both participants want to make sure that an order is not implanted by an antagonist.

Let X be the originator of a document M which has to be authenticated by receiving party Y. Let $\alpha^a$ be the (certified) public key of X. Authentication is performed as follows (All the described exponentiations are modular. That is, in the case of operating over GF, they are performed modulo a polynomial.).

1) Y generates $\alpha^r$ for a random r, and sends $\alpha^r$ to X. Y also calculates $K=(\alpha^a)^r$.
2) X calculates $(\alpha^r)^a$ (Both parties arrive at a key $K=\alpha^{ra}$, common only to them.).
3) X calculates $S=M^k$, and transfers the pair M, S to Y (M may be encrypted by any conventional or proprietary encryption scheme, yielding the ciphertext S.).
4) Y verifies that M could have been transmitted only by X by calculating $M^k$ and comparing it to S (M and S constitute the received pair. K was calculated by Y in step 1).

User identification

The following steps form a standard procedure in which a person X identifies himself to Y.

a) X sends Y non-secret information $I_{pu}$, certified to belong to X.
b) Y sends X a random challenge C.
c) X sends Y a response $R(C, I_{pr})$, where $I_{pr}$ is private information associated with $I_{pu}$.
d) Based on $I_{pu}$, C and R, Y proves to himself that X is in possession of $I_{pr}$.

The above scenario is ideally implemented by operations over a finite field. The non-secret information $I_{pu}$ is some $\alpha^a$, where the exponent a is the private information $I_{pr}$. The challenge is some $\alpha^r$, where r is kept secret by Y. The response R is $(\alpha^r)^a$. Y then proves to himself that X is in possession of a, by exponentiating R to the $r^{-1}$—th power and comparing the result to $\alpha^a$.

Exchange of Keys

Diffie-Hellman

In the DH public key distribution system, parties X and Y, whose certified public keys are $\alpha^a$ and $\alpha^b$, always arrive at the same common key $\alpha^{ab}$. Different session keys can be generated if party X, which we term here "the initiator", generates a different key $\alpha^a$ during each session, signs it with an EG viz. an El-Gamal signature, for example, and sends it to the other party, Y. X's signature is needed in order for Y to make sure that he is really exchanging a session key with X. Here the public keys of X and Y do not serve the same purpose. X's public key is needed by Y to validate X's signature on the received value $\alpha^a$. Y's public key is $\alpha^b$, which together with $\alpha^a$ forms the secret session key $\alpha^{ab}$ (X's and Y's public keys are of course certified by the issuing authority).

No encryption operation is involved in the process, as the exchanged information $\alpha^a$ is non-secret. That is, when sending $\alpha^a$ to Y, X is not making use of Y's public key. This procedure is totally different from an RSA-based key exchange scenario, where a secret session key generated by the initiator is signed by him and encrypted by the recipient's public key.

In other cases as well application can be made of an exponentiation operation over a finite field or Galois field. The possibility of operating over GF($2^n$) was frequently raised in the art, for instance in C. C. Wang et al., "VLSI Architectures for Computing Multiplications and Inverses in GF($2^m$)", [IEEE Trans. on Comput., Vol. C-34, pp. 709-716, 1985]; T. Beth et al., "Architectures for Exponentiation in GF($2^n$)" [Advances in Cryptology—EUROCRYPT '86, LNCS 263, pp. 302-310]; and P. A. Scott et al., "Architectures for Exponentiation in GF($2^m$)" [IEEE J. Sel. Areas Commun., vol. SAC-6, pp. 578-586, 1988]. A computational method and apparatus and a way of performing addition, squaring and multiplication in Galois field arithmetic are described in U.S. Pat. No. 4,587,627.

Figure 1:
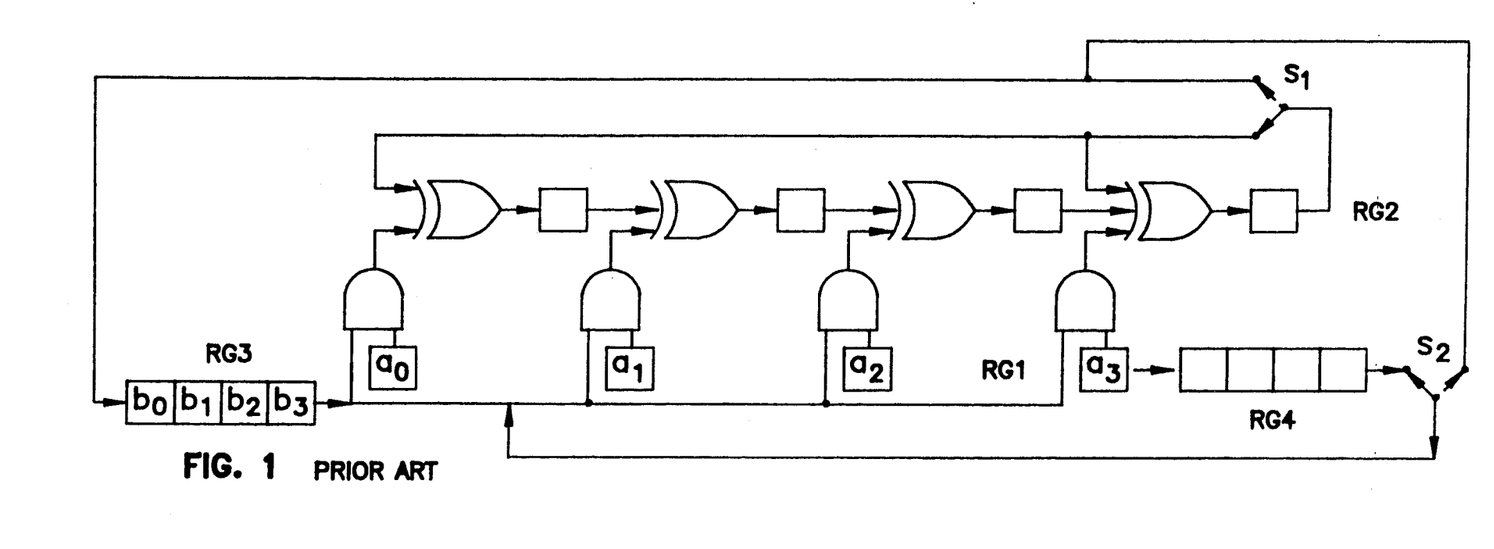
FIGS. 1 and 2 schematically illustrate two circuits for exponentiation over $GF(2^4)$, according to the prior art.

Circuits for exponentiation over GF($2^n$) have been described in the prior art, for instance in the cited P. A. Scott et al. publication. An example of such a circuit, suited for exponentiation over GF($2^4$) for the sake of simplicity, is schematically represented in FIG. 1. This circuit operates over the standard polynomial basis. It comprises four registers. The vector B to be squared is stored in RG3. The factor A by which said vector is to be multiplied is stored in RG1. A is also the field element to be exponentiated. RG2 is part of a LFSR (Linear Feedback Shift Register) multiplication circuit. RG4 is a buffer register in which A is stored when squaring B, which is done by duplicating B in register RG1 and treating it as a factor by which B itself is multiplied. In other words, squaring is treated as multiplication of a vector by itself. Any variation of this type of circuit must always contain four registers when operating over the standard basis, according to the prior art, because of the manner in which the squaring operation is performed. The art has also described the cases in which only three registers are used: T. Beth et al., "Architectures for Exponentiation in GF($2^n$)" [Advances in Cryptology—EUROCRYPT '86, LNCS 263, pp. 302-310] and the cited U.S. Pat. No. 4,587,627, but when exponentiating not over the standard base but over the normal base, in which case squaring is performed by a single cyclic shift. However, in this case, as in the circuit schematically represented in FIG. 2, besides three registers, extra hardware in the form of at least $n-1$ XOR gates is required. This hardware is evidenced in FIG. 2 by enclosing it in a broken line rectangle. This hardware is equivalent to at least an extra register, if dynamic registers are used, as discussed later.

It is a purpose of this invention to carry out exponentiation over GF($2^n$) with a reduced amount of hardware, both in the macro level, where an entire register is eliminated, and in the micro level, where the registers are implemented as dynamic registers. Modular structure further facilitates the hardware implementation.

It is a more specific purpose of this invention to carry out exponentiation over GF($2^n$) by using only three registers, and without introducing other excessive hardware.

It is a further purpose of this invention to effect said exponentiation with hardware reduction and with a more regular cellular structure.

It is a further purpose of this invention to permit implementation of public key systems over GF($2^n$) which requires a significantly larger size of parameters, for comparable cryptographic complexity, without requiring an increase in hardware resources.

Other purposes of this invention will appear as this description proceeds.

SUMMARY OF THE INVENTION

The invention is based on the consideration that squaring is a linear operation over GF($2^n$). In the exponentiation method according to the invention, the squaring operation is carried out by constructing a vector, the components of which are in alternation the components of the vector to be squared and the number 0.

More specifically, the method according to the invention involves squaring a vector having n components by constructing a vector having $2n-1$ components which are alternatively those of the vector to be squared and 0. More specifically, a vector $\chi=(c_o, c_1, c_2, \ldots, c_{n-1})$ is squared by constructing the vector $\chi^2=(c_o, 0, c_1, 0, c_2, 0, \ldots 0, c_{n-1})$. The vector $\chi^2$ never exists in its full length, since it is reduced modulo a primitive polynomial together with the alternative insertions of 0's.

Preferably, the construction of the square vector according to the invention is carried out by feeding the components of the vector to be squared—hereinafter called "the base vector"—to a register and inserting a 0 between each couple of successive elements of the base vector during its shift into said register. Since in an exponentiation circuit multiplication must also be carried out, said register to which the components are fed is conveniently a part of a multiplication circuit.

Correspondingly an apparatus for exponentiation over GF($2^n$) according to the invention comprises means for squaring a base vector (as hereinbefore defined), which means comprise means for storing the base vector, means for receiving the components of the square vector, and means for alternatively feeding to the receiving means the components of the base vector and the number 0. Preferably said alternatively feeding means comprise a switch device which alternatively connects the receiving means to the base vector storing means and to a source of 0. Still more preferably the base vector storing means is a register and the square vector receiving means is part of a LFSR multiplication circuit.

The apparatus according to the invention should include means for performing the multiplication operation to complete the square-and-multiply algorithm. This is preferably done by providing additional circuit means which are not essentially different in structure and operation from the corresponding means of the exponentiation circuits of the prior art and which include means, generally register means, for storing the vector—hereinafter called "the factor vector"—by which the base vector is to be multiplied. During the squaring operation said additional circuit means are disconnected possibly by putting zero into AND gates that are included therein. As will appear hereinafter, an exponentiation circuit of this kind for exponention over GF($2^n$) includes two structural units or cells that are not identical. Since the finite fields in which one operates have a degree n that is much higher and may be in the order of the thousands, both structural units or cells must be repeated many times. According to a form of the invention, this is avoided and other advantages are concurrently obtained.

In said form of the invention, the division phase of the modular multiplication operation is carried out in novel manner, which permits use of considerably simpler hardware than required by the manners taught in the prior art, e.g. in U.S. Pat. No. 4,587,627. Specifically, the polynomial which constitutes the modulo of the modular multiplication, instead of being fixed and predetermined, can be defined as desired and can be changed at will. The modular multiplication is thus effected through a single shift.

A circuit according to this form of the invention, therefore, comprises means for storing the components of the modulo primitive polynomial, which is the divisor in the division phase of the modular multiplication, and means for controlling the modular multiplication via said components.

Preferably, a circuit according to this form of the invention comprises an LFSR multiplication circuit and the means for controlling the modular multiplication comprise means for controlling the feedbacks to said LFSR multiplication circuit.

Still more preferably, the means for storing the primitive polynomial components are elements of a register, which are connected each to an AND equivalent gate, said AND gates controlling the feedbacks to the XOR equivalent gates of the LFSR multiplication circuit.

An exponentiation circuit according to the invention may comprise the novel squaring means defined above, in which case the division phase of the modular squaring operation will be performed in the same way as the division phase of the modular multiplication, using the same means for storing the primitive polynomial and the same feedback control means.

In this form of the invention, the circuit preferably comprises only one type of repetitive structural unit or cell, said cell comprising a XOR gate, a first register element in series to the XOR gate, a second register element, and AND gate for receiving a feedback and transmitting it to the XOR gate, and a third register element connected to the AND gate for controlling the feedback.

Figure 2:
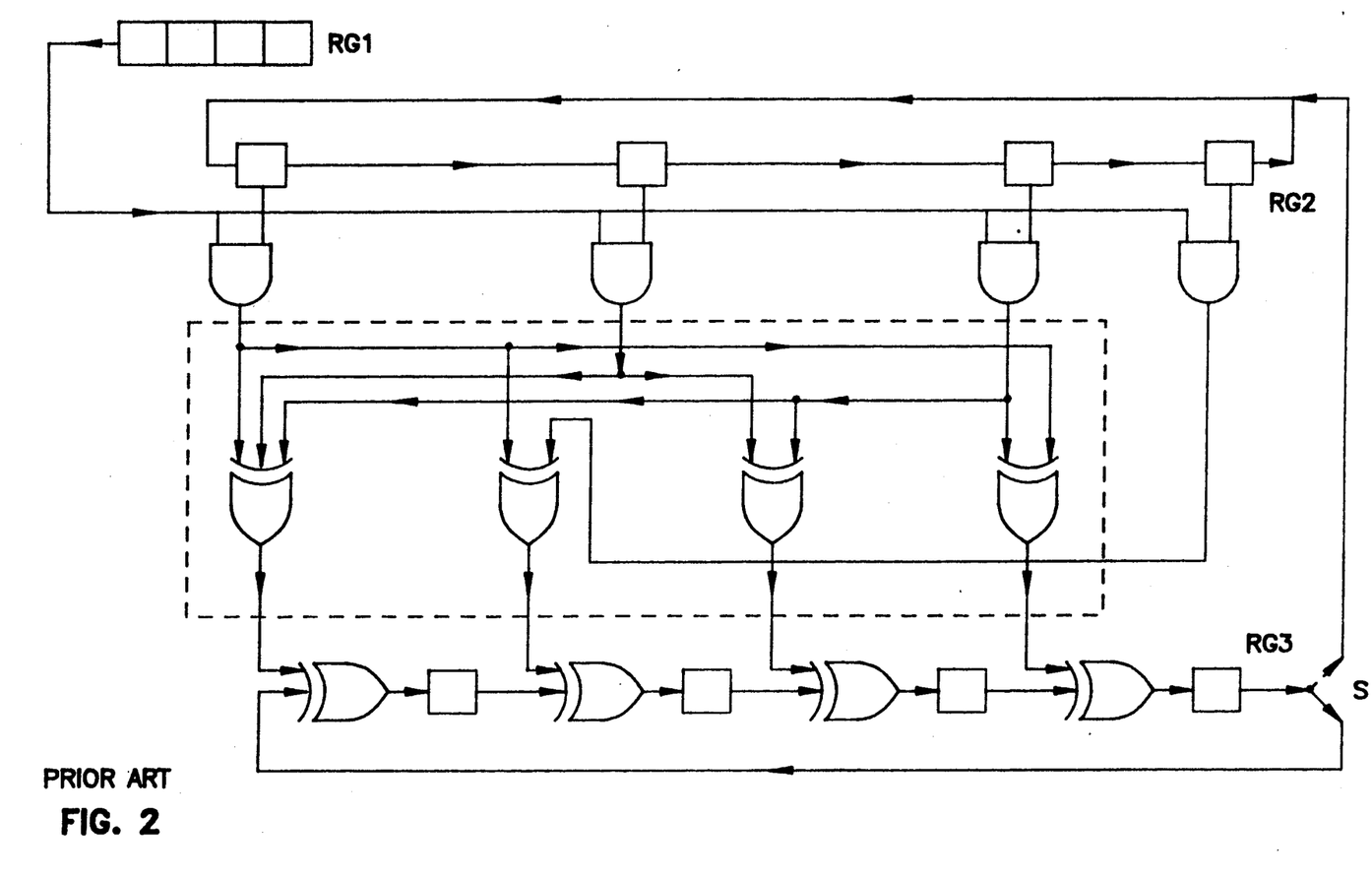

Alternatively, however, different squaring means could be used, e.g. those illustrated in FIGS. 1 and 2.

The register elements referred to hereinbefore may be static flip-flops, but they may be different therefrom. As all the registers are constantly moving and zeroed, and therefore naturally cleared, dynamic type registers can be used as memory elements, without memory controllers, and this is a further aspect of the invention. A structure of a dynamic shift register will be described hereinafter.

Further, on those registers wherein a XOR or XNOR gate is placed between the shifting cells, these logic elements can be used as the amplifying elements in the registers.

DESCRIPTION OF THE INVENTION

Further aspects and advantages of the invention will appear as the description proceeds.

The invention will be better understood from the following description of preferred embodiment, with reference to the appended drawings, wherein:

DETAILED DESCRIPTION OF PREFERRED EMBODIMENTS

Figure 3:
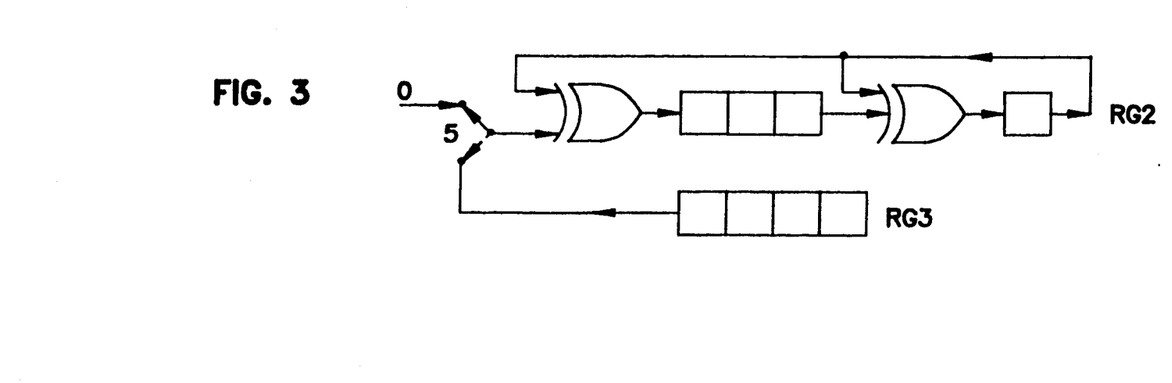
FIG. 3 schematically represents a circuit for squaring over $GF(2^4)$ according to the invention.

FIGS. 1 and 2 have already been briefly discussed and are self-explanatory for a person skilled in the art. With reference now to FIG. 3, a circuit is schematically illustrated for squaring over $GF(2^4)$, the operations being generated by $f(x) = 1 + x^3 + x^4$. The base vector is stored in register RG3. Numeral 5 indicates a switch, which alternates between the "down" position, in which it shifts the components of the base vector from RG3 to register RG2, while in the up position it feeds the number 0 to RG2. A square vector is thus generated in RG2, the components of which are alternatively the components of the base vector and 0. This squaring circuit lacks the multiplication phase to carry out exponentiation and therefore it will not generally be used as such; nevertheless it constitutes an independent aspect of the invention and is claimed herein per se.

Figure 4:
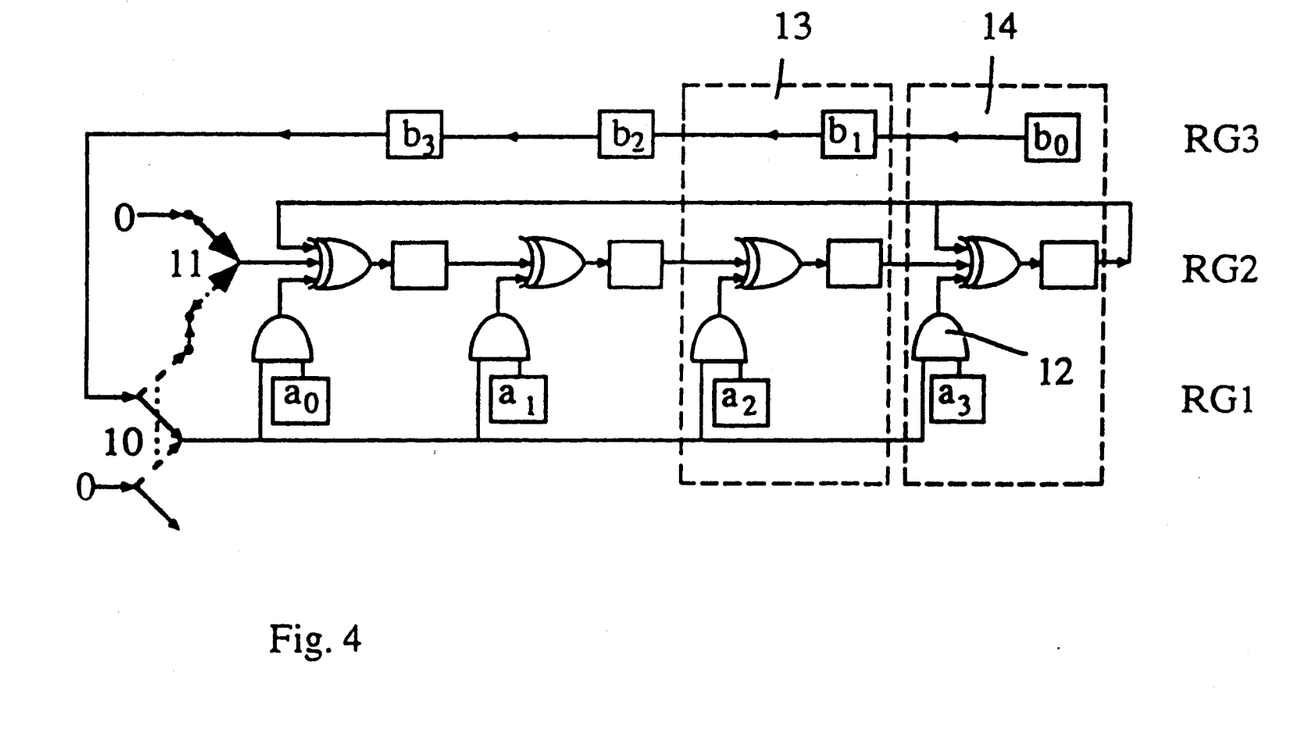
FIG. 4 schematically illustrates an exponentiation circuit according to a preferred embodiment of the invention.

An exponentiation circuit according to a preferred embodiment of the invention is schematically illustrated in FIG. 4. Therein RG3 indicates a register in which the base vector $\beta = (b_0, b_1, b_2, \ldots b_{n-1})$ is stored. The factor vector $\alpha = (a_0, a_1, a_2, \ldots, a_{n-1})$ is stored in register RG1. 10 and 11 are two switches. During the multiplication phase, which takes place in this case in a conventional way, switch 10 is in its "down" position and forms part of the multiplication circuit, while switch 11 is in its "up" position. During the squaring phase, switch 10, in its "up" position, disconnects the circuitry of register RG1 by inputting 0 into the AND gates 12. Switch 11 alternates between its two positions. When it is in its "down" position, a component of the base vector is fed from RG3 to RG2.

When it is in its up position, RG3 is disconnected from RG2 and a 0 is fed into this latter. The vector $\beta^2 = (b_0, 0, b_1, 0, b_2, 0, \ldots, 0, b_{n-1})$ is thus constructed from the contents of RG2 after $2n-1$ shifts. It is seen that RG3 is shifted at half the rate of RG2, or in other words the squaring time is doubled, with respect to the prior art circuits described, to 2n clock cycles instead of n. This increase in the duration of the operation is however irrelevant in practice, with respect to the saving in circuitry which is achieved by eliminating one of the registers of the prior art.

The circuit represented in FIG. 4 can be implemented with dynamic shift registers, fabricated using a fraction of the transistors used in a similar static design. Due to the inherently limited size of a smartcard-mounted chip, the possible use of such registers might be a major consideration. The deficiency of such registers is that they fade within a short time (approximately 1 ms), unless they are shifted frequently, thus refreshing their contents.

During multiplication, the contents of RG1 is fixed while the contents RG3 is shifted into RG2. For registers which are about 1000 bits long, and clock rate of more than 1 MHz, the entire cycle takes less than 1 ms, during which period the contents of RG1 is not lost. As multiplication is always followed by squaring, during which time RG1 is disconnected (switch 10 in the "up" position) it can be circulated while RG2 and RG3 perform the squaring phase. Successive squarings may occur, during which time RG1 is still circulated.

Registers RG2 and RG3 can obviously be dynamic as they continuously shift.

It has been noted that the invention permits use of only three registers instead of four as in the case of the prior art circuit of FIG. 1 and like circuits.

The prior art circuit of FIG. 2 also comprises only three registers, but requires further XOR gates which amount in hardware to at least an extra dynamic register. What is even worse is the extensive irregularity introduced by the wiring of these XOR gates, which limits the possibility of efficient VLSI (Very Large Scale Integrated) circuit implementation.

Circuits according to the embodiment of the invention hereinbefore described comprise two circuit units or cells, framed in broken lines and indicated in FIG. 4 as 13 and 14 respectively, differing in their XOR gate structure (the said gates having two inputs in cell 13 and three in cell 14), a fact which affects the regularity of the circuit. If the exponentiation is to carried out over $GF(2^n)$ with n greater than 4, said gates have to be repeated—in practical cases, a large number of times. This makes the VLSI implementation somewhat inconvenient. This drawback is overcome in another, preferred embodiment of the invention, schematically illustrated in FIG. 5, wherein the squaring phase does not differ from the one described hereinbefore, but the division phase of the modular multiplication is carried out in a different, novel manner. The structure of this embodiment also enables the multiplication phase in the exponentiation algorithm to be carried out in a single shift.

The circuit of FIG. 5 comprises once again three registers, RG1, RG2 and RG3. 21 indicates once more a switch corresponding to switch 11 of FIG. 4 and operating in like manner in the squaring operation. RG1 stores primitive polynomials, which, together with AND gates 22, control the feedback structure of the LFSR RG2. Switch 20 diverts the contents of the LFSR into the feedback line during multiplication/squaring, and into RG3 when the content of the LFSR is to be squared again. In this case, however, to carry out exponentiation over $GF(2^n)$ with n greater than 4, only one structural unit or cell, enclosed in broken lines in the drawing and indicated by 23, need be repeated as many times as required, which simplifies the structure of the circuit and facilitates its VLSI implementation.

Figure 5:
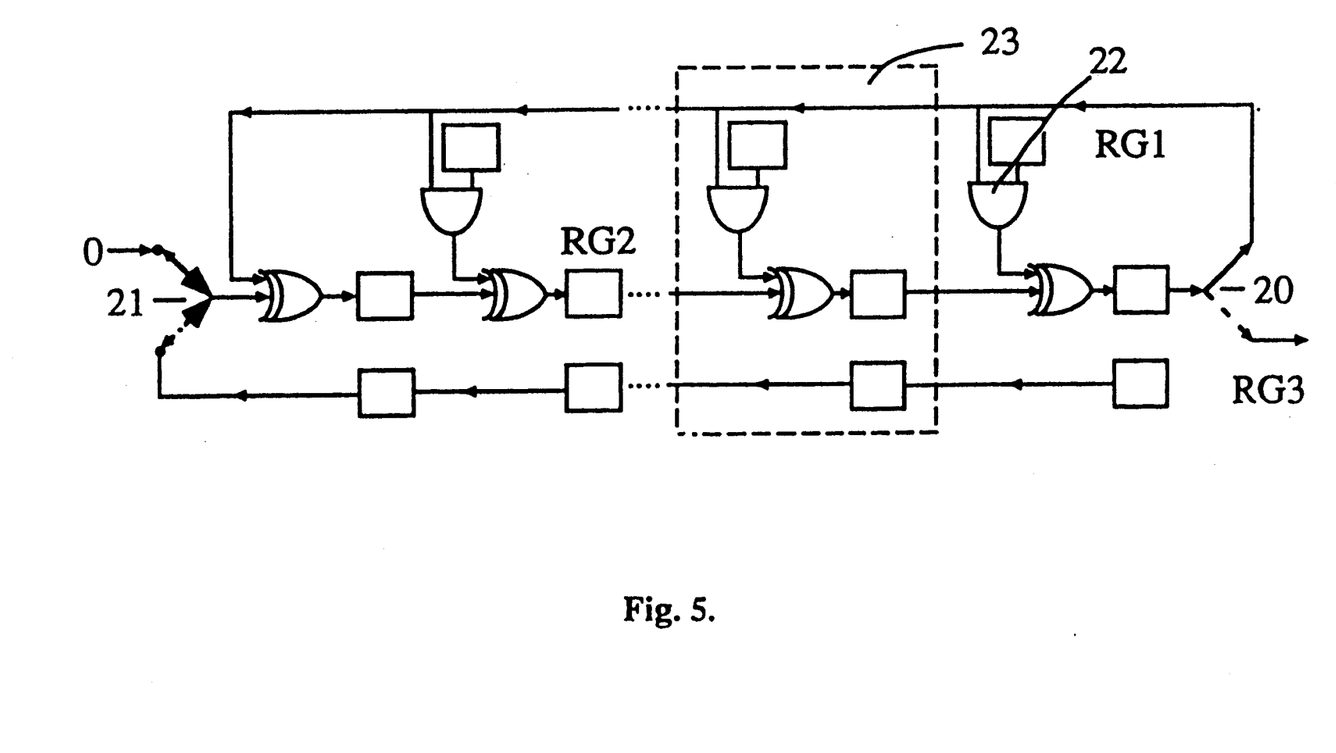
FIG. 5 schematically illustrates an exponentiation circuit according to another preferred embodiment of the invention.

The features and advantages of the form of the invention illustrated by the embodiment of FIG. 5 may be evidenced by considering its use in cryptography. In typical cryptographic systems one may find a terminal which is in communication with a number of subscribers to a system. Each subscriber has its own smart card. Messages are transmitted from the terminal to the cards and vice versa and public and private keys are used.

The following theorem has been established by the inventor:

Theorem: Let $f_1$ be a primitive polynomial of degree n, and let $\alpha_1$ be its root over $GF(2^n)$. Let $f_2$ be the minimum polynomial of $(\alpha_1)^y$, where $f_2$ is also primitive. Let $\alpha_2$ be the root of $f_2$ over $GF(2^n)$. Let P be an $n \times n$ matrix whose i th row is $(\alpha_1)^{iy}$, $i = 0, 1, \ldots, n-1$.

Then $(\alpha_2)^z P = (\alpha_1)^{yz}$ for any z.

(Note: $(\alpha_1)^y$ and $(\alpha_2)^z$ mean that the exponentiation is performed modulo $f_1$ and $f_2$, respectively. Also, $f_2$ is primitive iff gcd $(2^n - 1, y) = 1$.)

Let $(\alpha_1)^x$ and $(\alpha_1)^y$ be signals generated at a smartcard and a terminal, respectively, where $\alpha_1$ is the root over $GF(2^n)$ of a primitive polynomial $f_1$, commonly accepted by all participants. Various cryptographic applications were suggested in which $[(\alpha_1)^y]^x$ was calculated at the card, and $[(\alpha_1)^x]^y$ at the terminal. For gcd $(2^n - 1, y) = 1$, let $f_2$ be the primitive minimum polynomial of $(\alpha_1)^y$. In view of the Theorem:

$$(\alpha_2)^x = [(\alpha_1)^x]^y P^{-1} \quad (1)$$

for the matrix P defined in the Theorem.

Note that calculating the left hand side of Equation (1) means exponentiations modulo $f_2$ of its root $\alpha_2$. Thus, when calculating $(\alpha_2)^x$ by executing the square-and-multiply algorithm, the 'multiply' by $\alpha_2$ is obtained by a single shift.

The rows of the matrix $P^{-1}$ on the right hand side of Equation (1) are $(\alpha_2)^{iz}$, $i = 0, \ldots, n-1$, where $z = y^{-1}$ mod $(2^n - 1)$.

Now, based on the above, the terminal, instead of submitting $(\alpha_1)^y$ to a card, can submit the minimum polynomial $f_2$ of $(\alpha_1)^y$ and the card then calculates $(\alpha_2)^x$. The card still submits to the terminal its $(\alpha_1)^x$ and the terminal will calculate $[(\alpha_1)^x]^y P^{-1}$, arriving at the same result.

A secret key-public key pair $\{y; f_2\}$ is generated by first choosing a y such that gcd $(2^n - 1, y) = 1$, and then generating the minimum polynomial $f_2$ of $\alpha^y$. The amount of computations needed for calculating $f_2$ for a given $\alpha^y$ does not exceed a single exponentiation operation.

Compared to the customary complete modular exponentiation operation performed at both ends, the suggested approach enables multiplications (not squaring) based on one shift at the card, which are traded for an extra $n-2$ multiplications and up to $n-1$ additions at the terminal. Besides the saving in time, there is also some hardware reduction at the card and a more regular cellular structure, facilitating VLSI implementation.

The public key $f_2$ sent by the terminals is the primitive polynomial controlling the feedback connections of RG2. The received $f_2$ is stored in register RG1. The card has to exponentiate the root $\alpha_2$ of $f_2$ to the x-th power (the operation is done modulo $f_2$). Using the square-and-multiply algorithm, the contents of RG2 is multiplied by $a_2$ by shifting the register once.

On observing the circuit of FIG. 4, it is realized that the 'multiply' phase is implemented by 2n shifts, as the contents of RG2, to be multiplied by the exponentiated field element, first has to be shifted into RG3, and then shifted again into RG2, taking altogether 2n shifts. These 2n shifts are replaced here by a single shift of RG2, as the multiplication is performed in RG2, without first shifting its contents out.

Register RG3 stores the element to be squared during the exponentiation (Squaring is performed by alternate switching of 10, in the form already described). This element was formed before the contents of RG2 were, and was then shifted into RG3. Registers RG2 and RG3 and be naturally implemented as dynamic shift registers, as they shift continuously. RG1 can also be a dynamic shift register whose contents are refreshed by circulating it while the contents of RG2 are fed (via S2) into RG3.

In carrying out multiplication as in the embodiment of FIG. 5, the implementation of squaring can be any method for squaring over a standard basis, since the suggested method for performing 'multiply' by a single shift is independent of the squaring implementation. One can use the circuit of FIG. 1. The number of registers in this case will still be 4 since register RG1, which stores the product term, is replaced by a register which controls the feedback connections of RG2.

Concerning structural regularity, the three shift registers are constructed by repetitions of the cell framed in FIG. 5. This cell is identical in principle to the smaller of the two framed in FIG. 4. Besides the possible saving in time offered by the circuit of FIG. 5, there is therefore also some hardware reduction and a more regular cellular structure, facilitating VLSI implementation.

It is interesting to compare the functioning of the circuit of FIG. 5 to that of FIG. 2. The first operates over the standard (polynomial) basis, and the second over the normal basis. The first implements a *multiplication* operation in one shift, whereas the second implements the *square* operation in one shift. The second circuit is faster, since:

a) During exponentiation, the number of squaring operations is on the average twice that of multiplications.

b) The second circuit implements a multiplication in n shifts, whereas the first implements squaring in 2n shifts.

Figure 6:
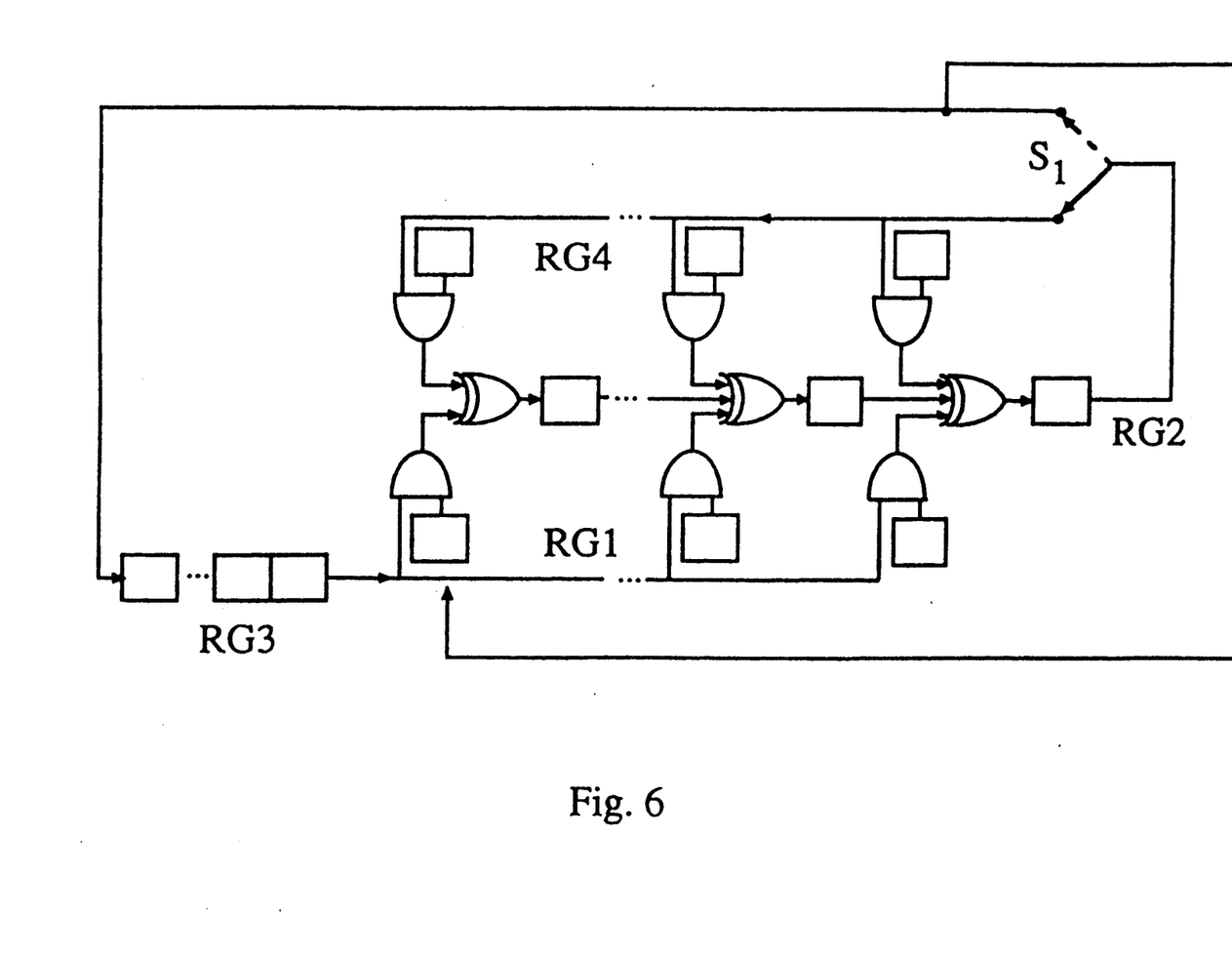
FIG. 6 illustrates an exponentiation circuit according to a further preferred embodiment of the invention.

FIG. 6 illustrates an exponentiation circuit in which multiplication is carried out as in the embodiment of FIG. 5, but squaring is carried out according to the prior art. The circuit operates according to the principle of the exponentiation circuit of FIG. 1, with the additional option of FIG. 5, enabling flexibility in choosing the feedback structure, i.e. operating modulo different primitive polynomials. The advantage of such a circuit could be in performing the 'multiply' phase in the square-and-multiply exponentiation algorithm, in one shift. Squaring is still done by multiplying two copies of the element to be squared. These two copies are stored in RG1 and RG2. Note that the buffer RG4, used in FIG. 1 for storing the element to be exponentiated during the 'square' phase, is not needed in the circuit of FIG. 6.

Figure 7:
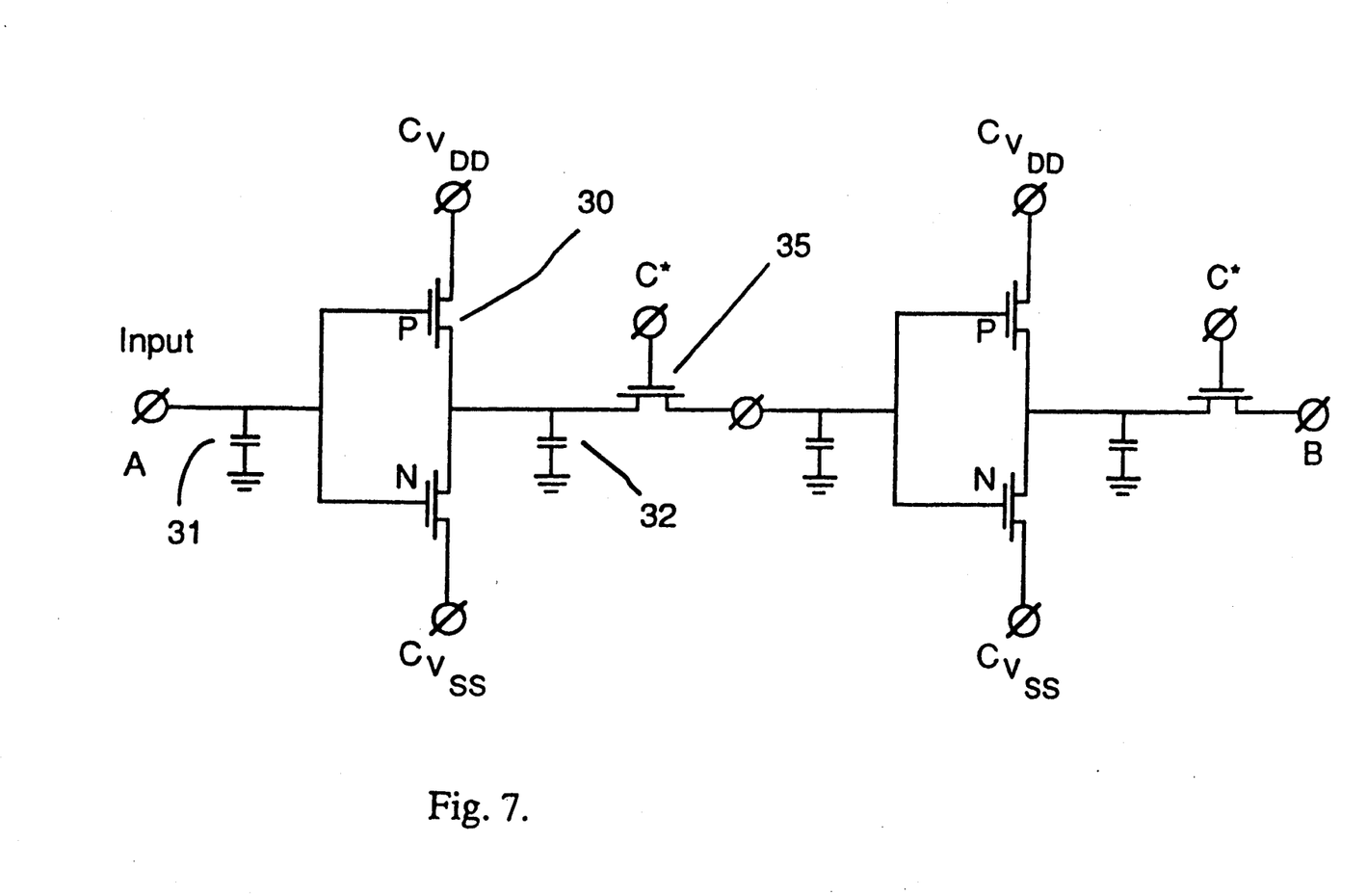
FIGS. 7 and 8 schematically illustrate two structures of register elements according to other embodiments of the invention.

FIG. 7 illustrates a circuit of an inverting cell that can be used in an even numbered very long dynamic shift register. Two cells are shown in the drawing. The capacitors 31 and 32 that are indicated need not be separate elements, but may be natural circuit capacitances. An inverter of conventional structure is indicated at 30. Voltages $C_{vdd}$ and $C_{vss}$ can be applied thereto. A pass transistor 35 is in series thereto. The inverter 30 is placed alternatively in an "on" and in an "off" state, by alternatively energizing and disconnecting $C_{vdd}$ and $C_{vss}$. During the "off" phase the pass transistor is put in conductance.

Figure 8:
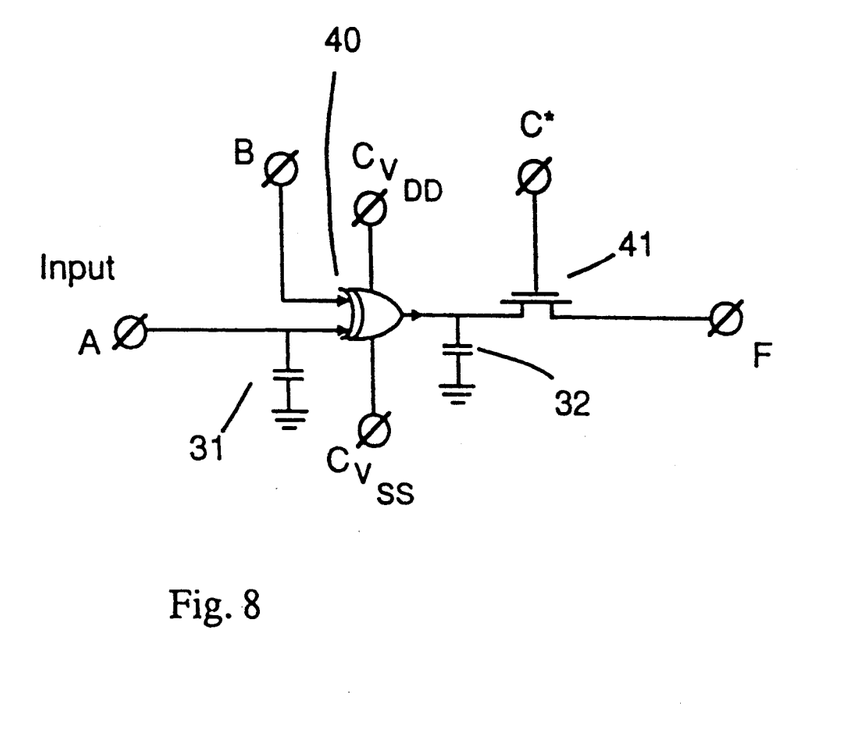

FIG. 8 shows a shift element that can be used in registers where a XOR or XNOR signal drives each register cell. The XOR or XNOR gate 40 is put in the "on" or "off" state by alternatively energizing and disconnecting $C_{vdd}$ and $C_{vss}$ and supplies the same type of amplification that is supplied by the inverted in the embodiment of FIG. 7. Once again, a pass transistor 41 is provided in series to the gate, with the proper capacitance symbolically indicated once again at 31 and 32.

While a number of embodiments of the invention have been described by way of illustration, it will be understood that the invention can be carried into practice in a number of other ways, without departing from its spirit or from the scope of the appended claims.

I claim:

1. An apparatus for performing modular arithmetic in a finite field $GF(2^n)$, comprising squaring means for squaring a base vector, wherein the base vector includes a plurality of components and wherein the means for squaring comprise dividing means for dividing a vector by a modulo primitive polynomial and feeding means for alternatively feeding to the dividing means the components of the base vector and the number 0.

2. An apparatus according to claim 1, wherein said feeding means comprise base vector storing means for storing the components of the base vector, zero producing means for supplying a representation of the number 0 and a switch which alternatively connects the dividing means to the base vector storing means and to the zero producing means.

3. An apparatus according to claim 2, wherein the base vector storing means is a register and the dividing means is part of a LFSR multiplication circuit.

4. An apparatus according to claim 2 wherein the apparatus further comprises circuit means for multiplying the squared base vector by a factor vector, wherein the circuit means comprise register means for storing the factor vector and means for disconnecting said register means while squaring the base vector.

5. An apparatus according to claim 4, wherein the disconnecting means comprise a plurality of AND gates and means for controlling the AND gates to disconnect the factor vector register means.

6. A method of squaring a vector in a finite field $GF(2^n)$, the method comprising the steps of:
a) providing a shift register;
b) providing feedback means for controlling feedback of elements within the shift register;
c) shifting a first element of the vector to be squared into the shift register;
d) shifting a zero into the register;
e) shifting a subsequent element of the vector to be squared into the shift register; and
f) repeating steps d and e until all elements of the vector to be squares have been shifted into the shift register.

7. Apparatus for performing modular arithmetic, comprising means for storing components of a modulo primitive polynomial, modular multiplication means for modularly multiplying a first vector by a second vector and means for controlling the modular multiplication via said components.

8. Apparatus according to claim 7 wherein the modular multiplication means comprise an LFSR multiplication circuit and wherein the means for controlling the modular multiplication comprise means for controlling feedback to said LFSR multiplication circuit.

9. Apparatus according to claim 8, wherein the means for storing the primitive polynomial components comprise a polynomial component register having a plurality of register elements, wherein the means for controlling the feedback to said LFSR multiplication circuit comprise a plurality of AND gates controlling feedback to XOR gates of the LFSR multiplication circuit and wherein each polynomial component register element is connected to one of said AND gates in order to control feedback within the LFSR circuit.

10. Apparatus according to claim 9, wherein the polynomial component register comprises a repetition of register cells, wherein each register cell comprises an invertor, a pass transistor and means for alternatively putting the invertor in "on" and "off" phase.

11. Apparatus according to claim 10, wherein the invertor is a properly configured XOR or XNOR gate.

12. Apparatus according to claim 9 wherein the register elements are dynamic registers.

13. Apparatus according to claim 12, wherein a XOR gate is placed between successive shifting cells of the registers, and said XOR gate is used as an amplifying element in the registers.

14. Apparatus according to claim 12, wherein a XNOR gate is placed between successive shifting cells of the registers, and said XNOR gate is used as an amplifying element in the registers.

15. Apparatus according to claim 7, wherein the apparatus further comprises squaring means for squaring an n element base vector; wherein the squaring means comprise dividing means for dividing a vector by a modulo primitive polynomial and feeding means for feeding to the dividing means successive elements of the base vector alternated with the number zero.

16. Apparatus according to claim 15, wherein the means for storing the primitive polynomial and the feedback control means are common to the squaring means and the modulo multiplication means.

17. Apparatus according to claim 15, wherein the squaring means and the multiplication means comprises a single repetitive structural cell, said cell comprising a XOR gate, a first register element in series with the XOR gate, a second register element, an AND gate for receiving a feedback and transmitting it to the XOR gate, and a third register element connected to the AND gate for controlling the feedback.

18. A method of modularly multiplying a first vector by a second vector in a finite field $GF(2^n)$ to form a modular product of the first and second vectors through a single shift, the method comprising the steps of:

providing a shift register;

placing the second vector into the shift register;

calculating components of a modulo primitive polynomial of the first vector;

providing feedback means, dependant on said components of the modulo primitive polynomial, for controlling feedback of elements within the shift register, wherein said feedback means comprise means for storing said components and means for controlling modular multiplication via said components;

effecting one shift in said shaft register;

whereby the contents of the shift register, after the single shift, constitute the modular product of said first and second vectors.

19. A method for the modular exponentiation of a vector in a finite field $GF(2^n)$, defined by a modulus vector, the method comprising the steps of:

(a) providing a linear feedback shift register of length n;

(b) providing a factor vector to be exponentiated, a base vector and an exponent vector, wherein each vector comprises n elements and wherein the base vector is equal to one;

(c) updating the base vector for each successive element of the exponent vector, the step of updating the base vector comprising:

i) squaring the base vector, wherein the step of squaring the base vector comprises:

shifting the elements of the base vector into said linear feedback shift register while inserting the number zero alternatively between each two successive base vector elements, whereby after $2n-1$ shifts an n-component modularly squared base vector is generated; and     ii) if element i of the exponent vector equals 1, multiplying the base vector by the factor vector.

* * * * *

UNITED STATES PATENT AND TRADEMARK OFFICE
CERTIFICATE OF CORRECTION

PATENT NO. : 5,206,824
DATED : 27 April 1993
INVENTOR(S) : Arazi

It is certified that error appears in the above-identified patent and that said Letters Patent is hereby corrected as shown below:

In column 2, line 11, delete "$r=^1$-th" and insert --$r^{-1}$-th--.

In column 7, line 64, delete "$(2^n-1,y)-1$," and insert --$(2^n-1,y)=1$,--.

In column 8, line 29, delete "and" and insert --can--.

In column 9, line 28, delete "inverted" and insert --inverter--.

In column 10, line 9, delete "squares" and insert --squared--.

In column 11, line 19, delete "shaft" and insert --shift--.

Signed and Sealed this

Third Day of May, 1994

Attest:

BRUCE LEHMAN

Attesting Officer     Commissioner of Patents and Trademarks